No. 623,500. Patented Apr. 18, 1899.
J. G. CHERRY & S. W. BRAINARD.
LIQUID MEASURING MACHINE.
(Application filed May 24, 1897.)
(No Model.) 2 Sheets—Sheet 1.
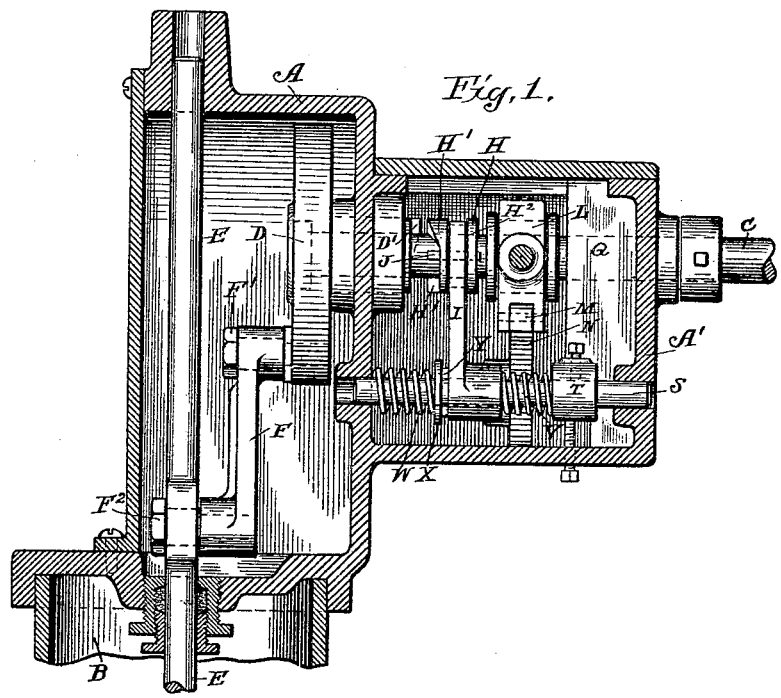
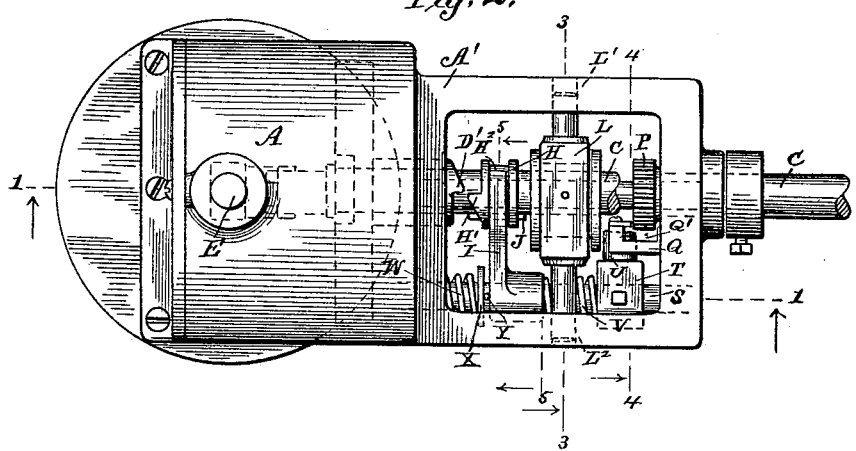
Witnesses,
E. Blannon
U. L. Cherry.
Inventors,
John G. Cherry and Sidney W. Brainard
By S. W. Brainard,
Their Attorney.
THE NORRIS PETERS CO., PHOTO-LITHO., WASHINGTON, D. C.

No. 623,500. Patented Apr. 18, 1899.
J. G. CHERRY & S. W. BRAINARD.
LIQUID MEASURING MACHINE.
(Application filed May 24, 1897.)
(No Model.) 2 Sheets—Sheet 2.
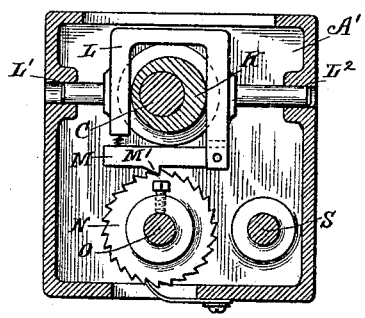
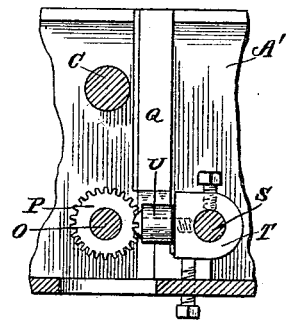
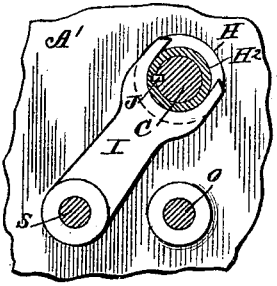
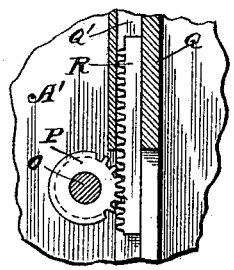
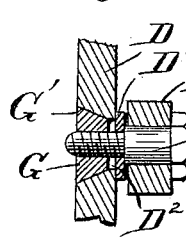
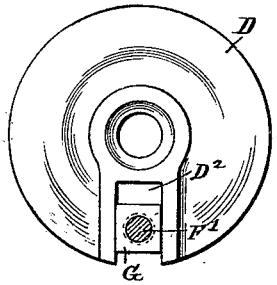
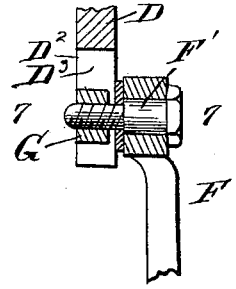
Witnesses,
Inventors,
John G. Cherry & Sidney W. Brainard,
By S. W. Brainard,
Their Attorney.
THE NORRIS PETERS CO., PHOTO-LITHO., WASHINGTON, D. C.

UNITED STATES PATENT OFFICE.

JOHN G. CHERRY AND SIDNEY W. BRAINARD, OF CEDAR RAPIDS, IOWA.

LIQUID-MEASURING MACHINE.

SPECIFICATION forming part of Letters Patent No. 623,500, dated April 18, 1899.

Application filed May 24, 1897. Serial No. 637,924. (No model.)

*To all whom it may concern:*

Be it known that we, JOHN G. CHERRY and SIDNEY W. BRAINARD, citizens of the United States, residing at Cedar Rapids, in the county of Linn, State of Iowa, have invented certain new and useful Improvements in Liquid-Measuring Machines; and we declare the following to be a full, clear, and concise description of same, reference being had to the following specification and accompanying drawings.

The purpose of our invention is to provide an entirely automatic liquid-measuring machine, one that is absolutely correct in its op15 eration and simple and durable in construction.

Referring to the drawings, Figure 1 represents a vertical sectional view of our machine, taken on the line 1 1 of Fig. 2. Fig. 2 is a top plan view of our machine having the top cover removed in order to clearly display the interior mechanism. Fig. 3 is a vertical section taken on the line 3 3 of Fig. 2, looking in the direction indicated. This view is intended to clearly illustrate the feed-actuating mechanism. Fig. 4 is a vertical section on the line 4 4 of Fig. 2 and is designed to show the check-feed wheel and relative parts. Fig. 5 is a vertical section on the line 5 5 of Fig. 2, showing the clutch and clutch-shifting lever and connected parts. Fig. 6 is a view of the check-feed wheel, check-chute, and check, showing the manner of feeding the check through the machine. Fig. 7 is a face view of the crank35 disk, showing the means by which the stroke of the piston-rod is adjusted. Fig. $7^a$ is a vertical sectional view through a portion of the crank-disk and link, clearly showing the manner of adjusting the stroke of the delivery mechanism. Fig. $7^b$ is a horizontal sectional view on the line 7 7 of Fig. $7^a$. Fig. 8 shows a full-size check of the design used in the machine as now constructed.

Similar letters refer to like parts both in the drawings and specification.

The frame composing a portion of our machine consists of two parts—the part A, designed to be placed on the top of an ordinary pump, and the part A', which is connected to and made a part of the portion A and is adapted to serve as a mounting for the operative portions of the machine.

B represents a fragmentary view of the top of an ordinary pump.

Mounted in suitable bearings in the frame A A' is a main shaft C, designed to be driven by means of a pulley or crank (not shown) placed on the right end of said shaft. Mounted loosely upon the shaft C at its extreme left end is a crank-disk D, which is connected to the pump piston-rod E by means of a link F. The hub of the crank-disk D is provided with a clutch-tooth D'. The crank-disk is further provided with a slot $D^2$, adapted to receive the adjusting-block G, to which the link F is secured by means of the wrist-pin F'. The sides or walls of the slot $D^2$ are tapered toward the rear, and the adjusting-block G has two of its sides tapered to correspond to and fit into the taper-sided slot $D^2$. The purpose of this is evident, for it will be seen that as the wrist-pin F' is turned toward the right the end which is threaded into the block G will draw the said block outwardly and wedge same tightly in the slot $D^2$. The opposite end of the link F is secured to the pump piston-rod E by means of another wrist-pin $F^2$.

The delivery of varying qualities of liquid at a stroke is affected by loosening the wrist-pin F' and moving the wedge-shaped block G either toward or from the center of the crank-disk, as may be required. When the desired adjustment is obtained, the wrist-pin F' will be turned, thereby tightly drawing the inclined faces G' of the block G against the inclined walls $D^3$ of the slot $D^2$ in disk D.

Mounted loosely upon the main shaft C, near its left end, is a clutch H, provided with suitable teeth H'. In the drawings we show two of these teeth placed oppositely, but one or more might be employed, as desired. Only one clutch-tooth should be made on the hub of the crank-disk, however, as this insures the piston starting and stopping at the same point each operation. The clutch is also provided with a circumferential groove $H^2$, adapted to receive the clutch-arm I. Rotary motion is imparted to the clutch H from the main shaft C by means of a spline or feather J, secured in the shaft. It will be seen, therefore, that the clutch has both lateral and rotary motion.

Mounted upon and secured to the main shaft C about midway its length is an eccentric cam K, adapted to actuate the yoke L, said yoke being mounted in suitable bearings L' L² in the frame. It will be seen that one of the downwardly-extending arms of the yoke has pivotally secured thereto the pawl M, provided with a suitable tooth M'. This pawl engages with and imparts an intermittent rotary motion to the ratchet-wheel N and shaft O. A corresponding motion is at the same time imparted to the check-feed wheel P, a pinion having teeth corresponding in number to those of the ratchet-wheel N.

Secured to the frame in some suitable manner (not particularly shown) is the check-chute Q, having a passage Q', rectangular in form when viewed in cross-section, for the reception and guidance of the checks R.

Mounted in suitable bearings in the frame A' and adapted to move laterally in either direction is the shaft S. Secured on the said shaft near its extreme right end is a lug T, having a roller U pivoted thereto and at right angles to shaft S. When the machine is not in operation, the roller U rests against the side of the check-chute Q, extending into or partly across the passage Q', as shown in Fig. 2.

We have placed loosely upon the shaft S, between the lug T and clutch-arm I, a coil-spring V, the purpose of which will be hereinafter fully set forth. A similar spring W is placed upon the extreme left of the shaft S, bearing at its left end against the wall of the frame and at its right end against a washer X, held by a pin Y, passed through the shaft S, as shown.

Referring to Fig. 8, Sheet 2, of the drawings, it will be seen that the check R has one lower corner R' beveled off at an angle of about forty-five degrees. It has been found necessary to so form the checks in order that they may "feed" the more readily and easily.

The operation of our machine will be readily understood. A rotary motion is imparted to the main shaft C by means of a belt-driven pulley or a crank placed upon the extreme right end of the said shaft. As the shaft C rotates the eccentric cam K imparts a reciprocating motion to the yoke L and connected pawl M, which in turn imparts an intermittent rotary motion to the ratchet-wheel N, actuating it one tooth for each reciprocation of the yoke L caused by each revolution of the main shaft C. This intermittent rotary motion of the ratchet-wheel N is imparted to the shaft O, to which it is secured, and in turn to the check-feed wheel P, also secured on the shaft O in its proper relation to the passage Q' of the check-chute Q. Now it will be seen that if a check be dropped into the check-chute Q gravity will carry same downward until the teeth of the check engage or mesh with the teeth of the check-feed wheel P, when the check will be gradually fed through for its whole length, it being moved forward one tooth for each revolution of the main shaft C. When the check-feed wheel first engages the check, the beveled portion R' of the check R comes in contact with the roller U and forces same to the left, carrying with it all the clutch-shifting mechanism— viz., the lug T, shaft S, spring V, clutch-arm I, and clutch H—thereby causing one of the teeth H' to engage the tooth D' of the crank-disk and thereby impart the rotary motion of the main shaft C to the crank-disk D, which in turn imparts a reciprocating motion to the pump piston-rod E by means of the connecting-link F. So long as the roller U is held in this position the pump will continue to operate; but when the upper end of the check R is fed past the center of the roller U the clutch H is instantly thrown out of engagement with the crank-disk D, when the latter instantly ceases to operate. The disengagement of the clutch is effected by the action of the spring W, previously compressed by the lateral motion of the shaft S and connected parts.

The spring V is placed between the lug T and clutch-arm I to allow the clutch to move independently toward the right in case any one should attempt to reverse the motion of the machine while a check was being fed the chute. Without this provision some part would have to "give" or break. This provision allows the disengagement of the clutch independently of the spring W, but only under the conditions mentioned. It will be seen that the check R is fed forward no matter in which direction the main shaft C is rotated, so that any attempt to beat the machine by reversing the motion would react doubly on the culprit—i. e., by feeding his check without a corresponding flow of liquid.

The capacity of the pump-cylinders may vary, and thus impart a varying value to the checks; but computation is easy, as each tooth of the check represents one stroke of the plunger in the cylinder and a corresponding delivery of liquid into some suitable receptacle provided for the purpose.

Our machine is intended particularly for use in creameries where cream-separators are employed to measure back the skim-milk due each patron, and as the amount due each one varies greatly it is important to have a machine that will work accurately and without effort on the part of the patrons, and for that reason we design to construct our machines with power only, but, as heretofore stated, a crank might be placed on the main shaft and the device operated by hand.

In our machine a check or number of checks is dropped into the check-chute, and the pump begins operating at once and continues without interruption until the check or checks are fed through the machine. Some suitable receptacle (not shown in the drawings) will be provided for receiving the checks after use.

The amount or percentage of cream in the milk is determined by measuring the amount of fresh milk pumped with the adjusting-block G and link F set a certain distance from the center of motion and then moved in toward the said center for weighing the milk when skimmed and "set" there for use. This test will not be found necessary oftener than once a month unless demanded by some patron.

Having thus described our invention, what we claim as new, and desire to secure by Letters Patent, is—

1. In a liquid-measuring machine, the combination with a suitable delivery apparatus, of a delivery-controlling mechanism, consisting of a check-feeding mechanism, a clutch-shifting mechanism, and a clutch, all arranged and adapted to operate substantially as set forth and shown.

2. In a liquid-measuring machine, the combination with a delivery apparatus of a delivery-controlling mechanism, consisting of a mechanism for feeding checks or tokens representing varying values, whereby the operation of the delivery apparatus is timed, and a clutch-shifting mechanism and a clutch adapted to automatically impart motion from the delivery-controlling mechanism to the delivery apparatus, all substantially as set forth and shown.

3. In a liquid-measuring machine the check-feeding mechanism, consisting of a yoke and pawl adapted to be reciprocated by a cam secured on a main shaft, a ratchet, a shaft, and a check-feed wheel adapted to be rotated by the reciprocation of said yoke and pawl, all substantially as set forth and shown.

4. In a liquid-measuring machine, the clutch-shifting mechanism, consisting of a shaft, a lug secured on said shaft, a roller pivoted to said lug and adapted to engage the checks, the clutch-arm and the springs, all substantially as set forth and shown.

In witness whereof we hereunto affix our hands, this 18th day of May, 1897, in the presence of the two subscribing witnesses.

JOHN G. CHERRY.
SIDNEY W. BRAINARD.

Witnesses:
J. B. SPALDING,
E. B. CAMERON.